(12) United States Patent
James

(10) Patent No.: US 11,414,787 B2
(45) Date of Patent: *Aug. 16, 2022

(54) DIE ASSEMBLY AND METHODS OF USING SAME

(71) Applicant: The Procter & Gamble Company, Cincinnati, OH (US)

(72) Inventor: Michael David James, Cincinnati, OH (US)

(73) Assignee: The Procter & Gamble Company, Cincinnati, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/914,556

(22) Filed: Jun. 29, 2020

(65) Prior Publication Data

US 2020/0325598 A1   Oct. 15, 2020

Related U.S. Application Data

(63) Continuation of application No. 12/855,772, filed on Aug. 13, 2010, now Pat. No. 10,704,166.

(60) Provisional application No. 61/233,990, filed on Aug. 14, 2009.

(51) Int. Cl.
| | | |
|---|---|---|
| *D01D 4/02* | (2006.01) | |
| *D01D 5/098* | (2006.01) | |
| *B29C 48/05* | (2019.01) | |

(52) U.S. Cl.
CPC ........... *D01D 4/025* (2013.01); *D01D 5/0985* (2013.01); *B29C 48/05* (2019.02)

(58) Field of Classification Search
CPC .......................... D01D 5/0985; D01D 4/025
See application file for complete search history.

(56) References Cited

U.S. PATENT DOCUMENTS

| | | |
|---|---|---|
| 1,310,509 A | 7/1919 | Specht |
| 2,991,168 A | 7/1961 | Nadel |
| 3,379,811 A | 4/1968 | Hartmann et al. |
| 3,437,725 A | 4/1969 | Pierce |
| 3,441,468 A | 4/1969 | Siggel et al. |
| 3,692,618 A | 9/1972 | Dorschner et al. |
| 3,737,506 A | 6/1973 | Martin et al. |
| 3,755,527 A | 8/1973 | Keller et al. |
| 3,758,658 A | 9/1973 | Riggert |
| 3,802,817 A | 4/1974 | Matsuki et al. |
| 3,825,379 A | 7/1974 | Lohkamp et al. |
| 3,825,380 A | 7/1974 | Harding et al. |

(Continued)

FOREIGN PATENT DOCUMENTS

| | | |
|---|---|---|
| EP | 0 495 466 B1 | 7/1992 |
| WO | WO 00/20674 | 4/2000 |

(Continued)

OTHER PUBLICATIONS

W. John G. McCulloch, Ph.D., The History of the Development of Melt Blowing Technology, International Nonwovens Journal, Spring 1999, pp. 66-72.

(Continued)

*Primary Examiner* — Jerzi H Moreno Hernandez
(74) *Attorney, Agent, or Firm* — C. Brant Cook

(57) ABSTRACT

A die assembly suitable for spinning filaments and more particularly to a die assembly having a fluid environment around the die assembly's filament exit holes is provided.

8 Claims, 4 Drawing Sheets

(56) References Cited

U.S. PATENT DOCUMENTS

| | | | |
|---|---|---|---|
| 3,849,241 | A | 11/1974 | Butin et al. |
| 3,888,610 | A | 6/1975 | Brackmann et al. |
| 3,954,361 | A * | 5/1976 | Page .................. D01D 5/0985 425/72.2 |
| 3,970,417 | A | 7/1976 | Page |
| 4,168,138 | A | 9/1979 | McNally |
| 4,295,809 | A | 10/1981 | Mikami et al. |
| 4,380,570 | A | 4/1983 | Schwarz |
| 4,486,161 | A | 12/1984 | Middleton |
| 4,622,259 | A | 11/1986 | McAmish et al. |
| 4,731,215 | A * | 3/1988 | Schwarz .................. D04H 1/76 156/167 |
| 4,818,463 | A | 4/1989 | Buehning |
| 4,818,466 | A | 4/1989 | Mente et al. |
| 4,826,415 | A | 5/1989 | Mende |
| 4,826,416 | A | 5/1989 | Majerus et al. |
| 4,847,035 | A | 7/1989 | Mente et al. |
| 4,855,179 | A | 8/1989 | Bourland et al. |
| 4,889,476 | A | 12/1989 | Buehning |
| 4,986,743 | A * | 1/1991 | Buehning .............. D01D 4/025 425/7 |
| 5,017,112 | A | 5/1991 | Mende et al. |
| 5,087,186 | A | 2/1992 | Buehing |
| 5,098,636 | A | 3/1992 | Balk |
| 5,112,562 | A | 5/1992 | Mende |
| 5,122,048 | A | 6/1992 | Deeds |
| 5,160,746 | A | 11/1992 | Dodge, II et al. |
| 5,165,940 | A | 11/1992 | Windley |
| 5,171,512 | A | 12/1992 | Mende et al. |
| 5,286,162 | A | 2/1994 | Veres |
| 5,286,182 | A | 2/1994 | Maeda et al. |
| 5,405,559 | A | 4/1995 | Shambaugh |
| 5,445,785 | A | 8/1995 | Rhim |
| 5,476,616 | A * | 12/1995 | Schwarz ................. B29C 48/05 264/6 |
| 5,523,033 | A | 6/1996 | Shambaugh |
| 5,632,938 | A | 5/1997 | Buehning, Sr. |
| 5,652,048 | A | 7/1997 | Haynes et al. |
| 5,679,379 | A | 10/1997 | Fabbricante et al. |
| 5,688,468 | A | 11/1997 | Lu |
| 5,725,812 | A | 3/1998 | Choi |
| 5,902,540 | A | 5/1999 | Kwok |
| 5,935,512 | A | 8/1999 | Haynes et al. |
| 5,951,942 | A | 9/1999 | Rossillon et al. |
| 6,013,223 | A | 1/2000 | Schwarz |
| 6,168,409 | B1 | 1/2001 | Fare |
| 6,244,845 | B1 | 6/2001 | Milligan et al. |
| 6,247,911 | B1 | 6/2001 | Milligan |
| 6,306,334 | B1 | 10/2001 | Luo et al. |
| 6,364,647 | B1 | 4/2002 | Sanborn |
| 6,491,507 | B1 | 12/2002 | Allen |
| 6,811,740 | B2 | 11/2004 | James et al. |
| 7,018,188 | B2 | 3/2006 | James et al. |
| 10,704,166 | B2 * | 7/2020 | James .................. D01D 4/025 |
| 2001/0026815 | A1 * | 10/2001 | Suetomi ................. D01D 4/025 425/7 |
| 2003/0146537 | A1 | 8/2003 | James et al. |
| 2004/0201127 | A1 | 10/2004 | James et al. |
| 2004/0209540 | A1 | 10/2004 | Schwarz |
| 2005/0048152 | A1 | 3/2005 | Gerking |
| 2005/0056956 | A1 | 3/2005 | Zhao et al. |
| 2006/0091582 | A1 * | 5/2006 | James .................. D01D 5/0985 264/211.11 |
| 2009/0256277 | A1 * | 10/2009 | Brown ..................... D01F 2/00 264/177.11 |
| 2011/0037194 | A1 | 2/2011 | James |

FOREIGN PATENT DOCUMENTS

| | | |
|---|---|---|
| WO | 2007101459 A1 | 9/2007 |
| WO | WO 99/34039 | 7/2009 |

OTHER PUBLICATIONS

Jayesh Natwarial Doshi, Ph.D., et al., The Electrospinning Process and Applications of Electrospun Fibers, IEEE Industry Applications, 1993, pp. 1698-1703.

Jayesh Natwarial Doshi, Ph.D., et al., The Electrospinning Process and Applications of Electrospun Fibers, The Journal of Electrostatics, 35, 1995, pp. 151-160.

International Search Report dated Dec. 22, 2010.

All Office Action U.S. Appl. No. 16/914,556.

* cited by examiner

DIE ASSEMBLY AND METHODS OF USING SAME

FIELD OF THE INVENTION

The present invention relates to a die assembly suitable for spinning filaments and more particularly to a die assembly comprising a fluid environment around the die assembly's filament exit holes.

BACKGROUND OF THE INVENTION

Die assemblies are known in the art. However, known die assemblies fail to define a controlled fluid environment around their filament exit holes. As a result, the die assemblies exhibit negatives with respect to the properties of the filaments formed by the die assemblies and/or the number of filaments capable of being made by the die assemblies.

Accordingly, there is a need for a die assembly that overcomes the negatives associated with filaments formed from die assemblies and/or the number of filaments capable of being formed by a die assembly.

SUMMARY OF THE INVENTION

The present invention fulfills the need described above by providing a die assembly that makes filaments that overcome the negatives associated with filaments formed from known die assemblies and/or the number of filaments capable of being formed by a die assembly.

In one example of the present invention, a die assembly comprising a nozzle plate comprising a plurality of filament forming nozzles comprising filament exit holes from which filaments exit the filament forming nozzles during operation and wherein the die assembly further comprises an enclosure plate that defines an open area around the filament forming nozzles, is provided.

In another example of the present invention, a die assembly comprising a nozzle plate comprising a plurality of filament forming nozzles wherein the filament forming nozzles comprise filament exit holes from which filaments are capable of exiting the filament forming nozzles during operation and wherein the die assembly defines a fluid environment in fluid contact with the filament exit holes that maintains greater than 85% of the effective jet width of the fluid environment across the filament exit holes, as measured according to the % Effective Jet Width Test Method described herein, during operation of the die assembly, is provided.

In another example of the present invention, a method for forming filaments, the method comprising producing filaments from a die assembly comprising a nozzle plate comprising a plurality of filament forming nozzles wherein the filament forming nozzles comprise filament exit holes from which filaments exit the filament forming nozzles during operation and wherein the die assembly further comprises an enclosure plate that defines an open area around the filament forming nozzles, is provided.

In yet another example of the present invention, a method for forming filaments, the method comprising producing filaments from a die assembly comprising a nozzle plate comprising a plurality of filament forming nozzles wherein the filament forming nozzles comprise filament exit holes from which filaments exit the filament forming nozzles during operation and wherein the die assembly defines a fluid environment in fluid contact with the filament exit holes that maintains greater than 85% of the effective jet width of the fluid environment across the filament exit holes, as measured according to the % Effective Jet Width Test Method described herein, during operation of the die assembly, is provided.

Accordingly, the present invention provides a die assembly suitable for spinning filaments from a polymer melt composition that overcomes the negatives associated with known die assemblies and a method for spinning filaments from such a die.

DETAILED DESCRIPTION OF THE INVENTION

Die Assembly

The die assembly and method of the present invention are suitable for producing filaments and products including such filaments, such as webs and/or fibrous structures. The die assembly and method of the present invention may be used to produce different types of filaments, including meltblown fibers, dry spun fibers and/or wet spun fibers. However, the die assembly and method are particularly suited for producing filaments from solvent, such as water, containing polymer melt compositions. The polymer materials suitable for use in the solvent containing polymer melt compositions include materials that are made flowable by dispersing, suspending and/or dissolving the material in a solvent.

In one example, the die assembly and method of the present invention are well suited for materials that are solvent-soluble, and thus dissolved in a solvent, such as water, prior to being forced through the filament forming holes to form filaments. Often it is desirable to attenuate, or stretch, the filaments exiting the filament exit holes of the die assembly.

The die assembly of the present invention comprises one or more filament forming nozzles comprising one or more filament exit holes from which filaments are capable of exiting the filament forming nozzles during operation and wherein the die assembly defines a fluid environment in fluid contact with the one or more filament exit holes that maintains greater than 85% and/or greater than 87% and/or greater than 89% to less than 99% and/or less than 95% and/or less than 91% of the effective jet width of the fluid environment across the one or more filament exit holes, as measured according to the % Effective Jet Width Test Method described herein, during operation of the die assembly.

Figure 1:
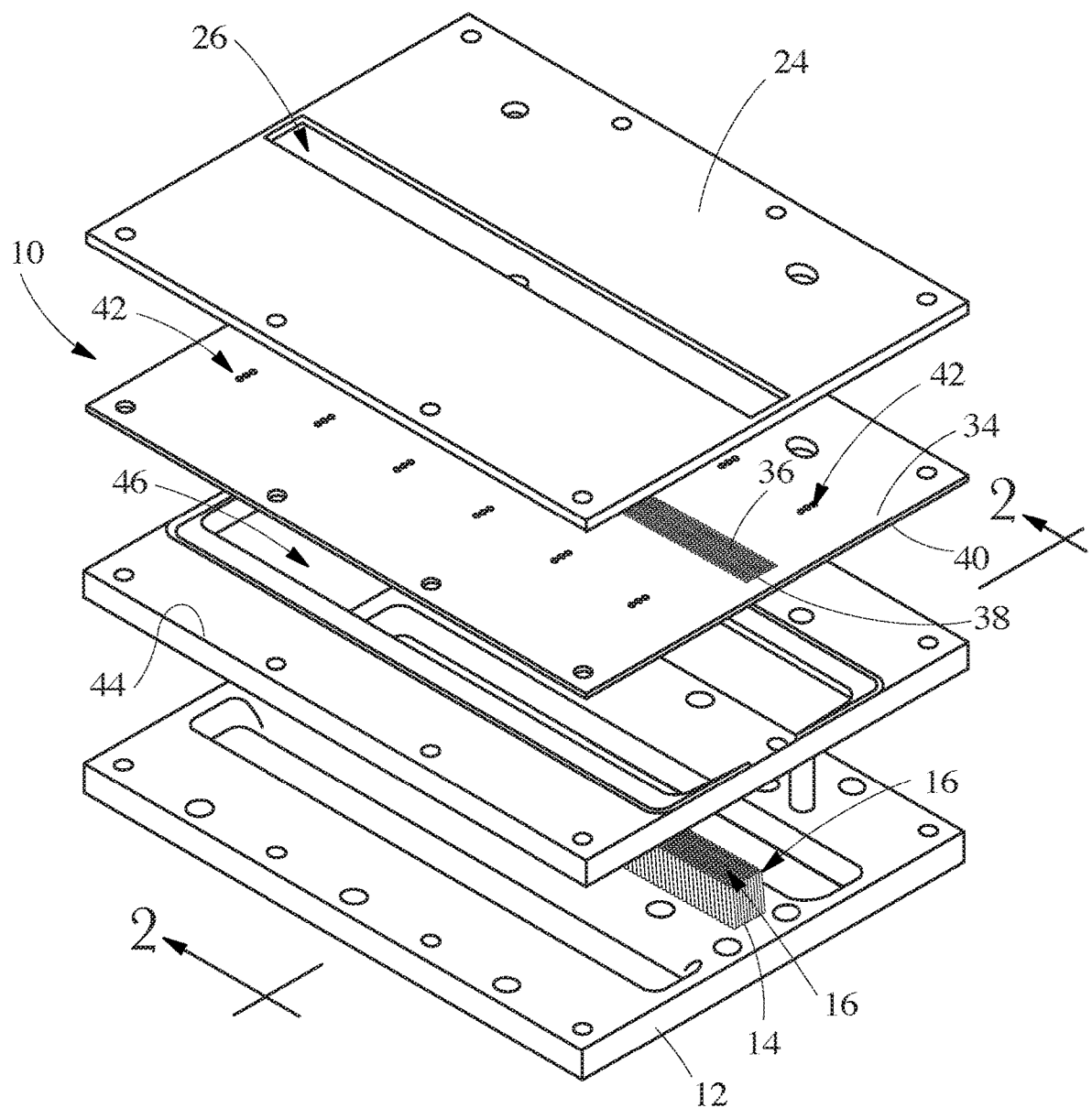
FIG. 1 is an exploded, perspective view of an example of a die assembly in accordance with the present invention.
Figure 2:
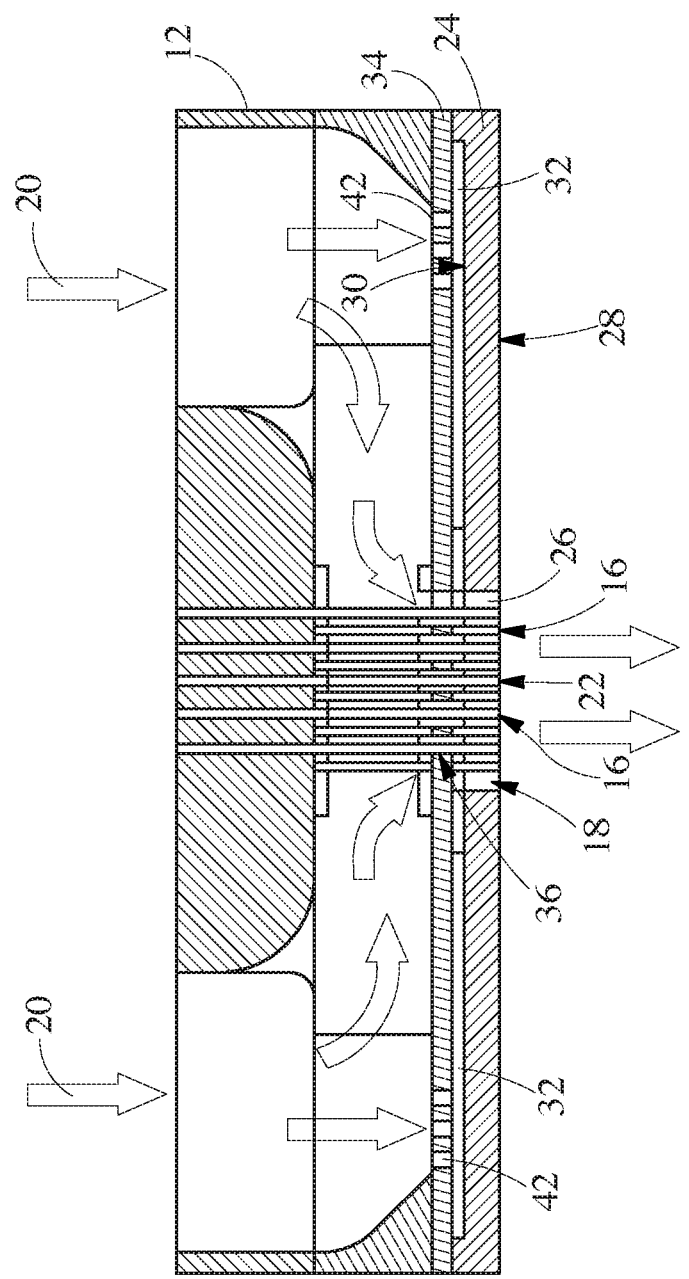
FIG. 2 is a cross-sectional view of the die assembly of FIG. 1 taken along line 2-2.

As shown in FIGS. 1 and 2, an example of a die assembly 10 in accordance with the present invention comprises a nozzle plate 12 comprising one or more filament forming nozzles 14. The filament forming nozzles 14 comprise filament exit holes 16. The die assembly 10 defines a fluid environment 18 in fluid contact with the filament exit holes 16 of the filament forming nozzles 14. The fluid environment 18 maintains greater than 85% of the effective jet width of the fluid environment across the filament exit holes 16 of the filament forming nozzles 14, as measured by the % Effective Jet Width Test Method, during operation of the die assembly 10.

The die assembly 10 may be designed to supply both the material from which filaments are formed and an attenuation medium (such as air, gas or other fluid) for attenuating the filaments as they exit the filament exit holes 16 of the filament forming nozzles 14. The die assembly 10 may be in fluid communication with one or more material sources, such as a polymer source, that supplies the material from which filaments are formed to the filament forming nozzles 14. The die assembly 10 may include at least one attenuation medium inlet 20 through which an attenuation medium may enter the die assembly 10. The attenuation medium inlet 20 may be in fluid communication with a fluid source, such as a source of air, gas or other fluid that is used as an attenuation medium when forming the filaments. The die assembly 10 further comprises an attenuation medium exit 22, which is the location at which the attenuation medium exits the die assembly 10.

The die assembly 10 may further comprise an enclosure plate 24. The enclosure plate 24 comprises an open area 26 into which the filament forming nozzles 14 extend. One or more of the filament forming nozzles 14 may extend completely through the open area 26. One or more of the filament forming nozzles 14 may be flush with a surface of the enclosure plate 24. One or more of the filament forming nozzles 14 may extend less than completely through the open area 26. The open area 26 comprises the fluid environment 18 that is in contact with the filament exit holes 16. The enclosure plate 24 may direct fluid, such as air, toward the filament exit holes 16. In one example, the enclosure plate 24 directs a fluid into the open area 26 comprising the fluid environment 18 at an angle of greater than 30° and/or greater than 45° and/or greater than 60° and/or to about 90° to the fluid environment 18.

The open area 26 may be of any shape so long as the filament forming nozzles 14 are in contact with the fluid environment 18.

The enclosure plate 24 further comprises an exterior surface 28 and an interior surface 30. The exterior surface 28 is exposed to the external environment. The interior surface 30 is positioned inwardly into the die assembly 10 towards the nozzle plate 12. The interior surface 30 defines a cavity 32 between the interior surface 30 and an air plate 34 within the die assembly 10. The cavity 32 is capable of receiving fluid, such as air, and directing it to the open area 26. In one example, the cavity 32 comprises one or more external environment openings, other than the open area 26, through which a fluid may enter the cavity 32 from the external environment and be directed to the open area 26.

The die assembly 10 may further comprise an air plate 34 as shown in FIGS. 1 and 2. The air plate 34 is positioned between the nozzle plate 12 and the enclosure plate 24. The air plate 34 comprises filament forming nozzle receiving holes 36 through which one or more of the filament forming nozzles 14 extend. At least one of the filament forming nozzle receiving holes 36 are sized such that an attenuation medium may also pass through the filament forming nozzle receiving hole 36 on its way from the attenuation medium inlet 20 to the attenuation medium exit 22.

In one example, the filament forming nozzle receiving holes 36 are aligned with the open area 26 such that the attenuation medium exits the filament forming nozzle receiving holes 36 into the open area 26.

In another example, the air plate 34 may further comprise one or more first air holes 38, void of a filament forming nozzle 14, but adjacent to one or more filament forming nozzle receiving holes 36. In one example, the first air holes 38 are positioned between one or more filament forming nozzle receiving holes 36 and an edge 40 of the air plate 34.

Figure 3:
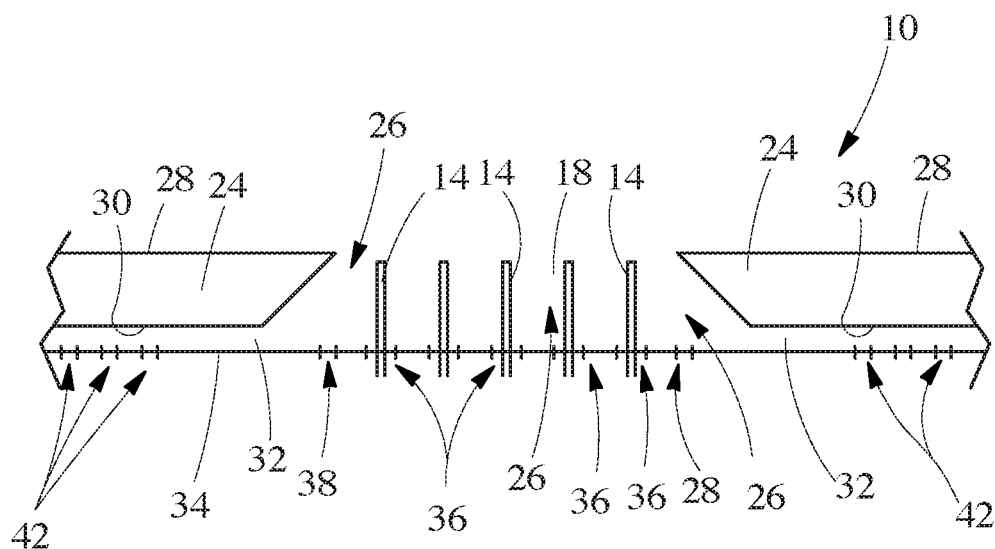
FIG. 3 is a normalized temperature profile graph showing the normalized temperature profile of a die assembly according to the present invention compared to a prior art die assembly.
Figure 4:
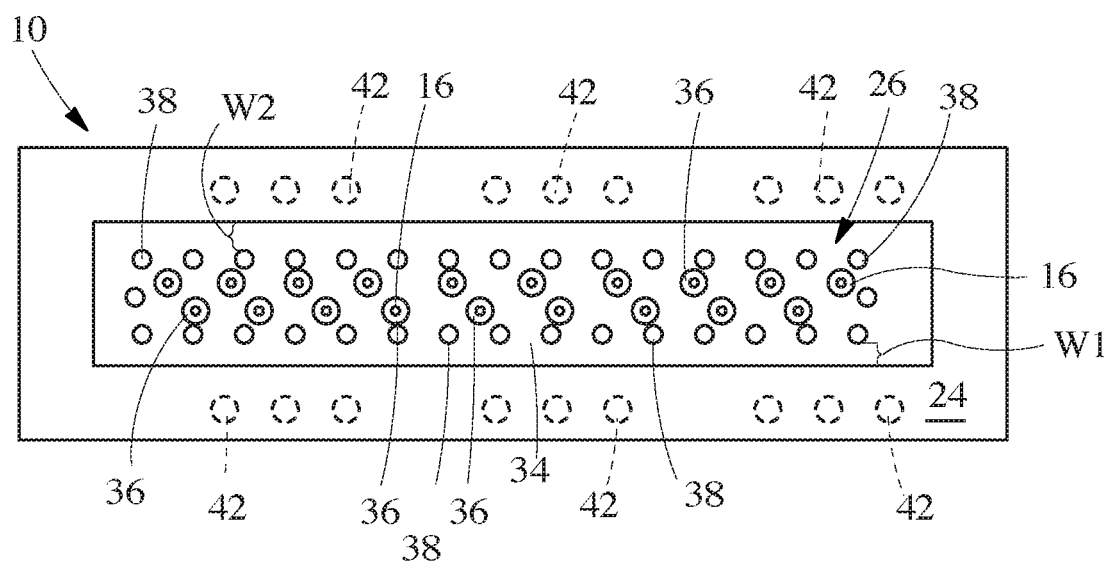
FIG. 4 is a schematic representation of a partial section view of components of an example of a die assembly according to the present invention.

In one example, as shown in FIGS. 3 and 4, the filament forming nozzle receiving holes 36 and the first air holes 38 are positioned within the open area 26. In one example, the open area 26 comprises a first gap W1 that defines a minimum distance between an edge of a first air hole 38 to an edge of the enclosure plate 24. In one example, the first gap W1 is less than 0.020 mm and/or less than 0.018 mm and/or less than 0.015 mm and/or less than 0.010 mm and/or less than 0.008 mm.

In another example, the open area 26 comprises a second gap W2 that defines a minimum distance between an edge of a first air hole 38 to an edge of the enclosure plate 24. In one example, the second gap W2 may be the same or different from the first gap W1. In another example, the second gap W2 is less than 0.020 mm and/or less than 0.018 mm and/or less than 0.015 mm and/or less than 0.010 mm and/or less than 0.008 mm.

Two or more of the first air holes 38 may exhibit the same or different diameters.

In still another example, the enclosure plate 24 may comprise parallel edges that define the open area 26. In yet another example, the enclosure plate 24 at least one edge that defines a boundary of the open area 26 that converges toward the filament exit holes 16 of the filament forming nozzles 14. In even yet another example, the enclosure plate 24 may comprise at least one edge that defines a boundary of the open area 26 that diverges away from the filament exit holes 16 of the filament forming nozzles 14.

In another example, the air plate 34 may comprise one or more second air holes 42, void of a filament forming nozzle 14, through which an attenuation medium may pass. The one or more second air holes 38 may be aligned with the cavity 32. The cavity 32 is capable of directing the attenuation medium from the second air holes 42 into the open area 26 as shown by the arrows. The attenuation medium from the second air holes 42 combines with the attenuation medium from the filament forming nozzle receiving holes 36 to form the fluid environment 18 during operation of the die assembly 10.

Two or more of the second air holes may exhibit the same or different diameters.

The arrows shown in FIG. 2 exemplify one or more attenuation medium flow paths through the die assembly 10 during operation of the die assembly 10.

The filament forming nozzles 14 may be formed from small metal tubes having generally circular cross-sections. Alternatively, the filament exit hole 16 of any particular filament forming nozzle 14 may have any cross-sectional shape, may have varying inner and/or outer effective diameters, may be tapered (e.g. the downstream outer effective diameter is less than the upstream outer effective diameter) or beveled and may be made from any suitable material. The filament forming nozzles 14 may all have the same upstream inner and/or outer effective diameter or may have different upstream inner and/or outer upstream effective diameters. Likewise, the filament forming nozzles 14 may all have the same downstream inner and/or outer effective diameter or may have different upstream inner and/or outer downstream effective diameters. Further, the filament forming nozzles 14 may be the same length or may be different lengths and/or may be mounted so as to extend from the nozzle plate 12 different amounts. The filament forming nozzles 14 may be made from a separate material that is mounted or otherwise joined to the nozzle plate 12 or may be formed in the material making up the nozzle plate 12 itself. The filament forming nozzles 14 may be permanently mounted to the nozzle plate 12 or may be removable and/or replaceable. Exemplary methods for mounting filament forming nozzles 14 in the nozzle plate 12 include, but are not limited to, laser welding, soldering, gluing, pressure fitting and brazing.

In one example of the present invention, as shown in FIGS. 1 and 2, the filament forming nozzles 14 are disposed in multiple adjacent rows, wherein each row includes a multiplicity of filament forming nozzles 14. Although FIGS. 1 and 2 show the filament forming nozzles 14 disposed in regular rows with equal numbers of filament forming nozzles 14 in each row, any suitable number of filament forming nozzles 14 may be in any particular row.

As shown, for example, in FIGS. 1 and 2, the die assembly 10 of the present invention may also include a spacer plate 44 positioned between the nozzle plate 12 and the air plate 34. The spacer plate 44 functions to direct the attenuation medium in a direction generally parallel to the filament forming nozzles 14 and to promote flow uniformity, as desired, throughout the attenuation area surrounding the filament forming nozzles 14. As such, the spacer plate 44 has a spacer plate opening 46 through which at least some of the filament forming nozzles 14 may extend.

Even though FIGS. 1 and 2 shows the die assembly 10 being made from individual components, the die assembly 10 may be a single piece.

Method for Forming Filaments

As discussed above, the die assembly of the present invention is suitable for forming filaments from materials, especially polymer materials.

In one example of the present invention, a method for forming filaments comprises the steps of producing filaments from a die assembly comprising a nozzle plate comprising a plurality of filament forming nozzles wherein the filament forming nozzles comprise filament exit holes from which filaments exit the filament forming nozzle during operation and wherein the die assembly defines a fluid environment in fluid contact with the filament exit holes that maintains greater than 85% of the effective jet width of the fluid environment across the filament exit holes, as measured according to the % Effective Jet Width Test Method, during operation of the die assembly.

The die assembly may comprise a material source that is in fluid communication with the filament forming nozzles such that the a material, for example a polymer material such as starch, is able to be passed through the filament forming nozzles and exit the filament exit holes to as filaments.

As the filaments are exiting the filament exit holes, the filaments are in fluid contact with the fluid environment.

The filaments may be subjected to attenuation by an attenuation medium, such as air, that contacts the filaments and attenuates the filaments as the filaments move downstream of the filament exit holes.

The filaments produced by the die assembly may be collected on a collection device, such as a belt or fabric, which may be patterned, to produce a web or fibrous structure.

Test Methods

Unless otherwise specified, all tests described herein including those described under the Definitions section and the following test methods are conducted on samples that have been conditioned in a conditioned room at a temperature of 73° F.±4° F. (about 23° C.±2.2° C.) and a relative humidity of 50%±10% for 2 hours prior to the test. All tests are conducted in such conditioned room.

% Effective Jet Width Test Method

The % effective jet width is determined by measuring the normalized temperature profile of the fluid environment across the filament forming exit holes of the filament forming nozzles of a die assembly.

A thermocouple probe (1.6 mm diameter) is mounted on a motorized traverse (Dantec systems, used with their Laser Doppler equipment). The thermocouple is mounted such that the tip can approach the die assembly from downstream to upstream; angling into the fluid environment in fluid contact with the filament exit holes of the filament forming nozzles of the die assembly. The traverse is used to position the tip of the thermocouple downstream of the die assembly and enclosure plate by 1.6 mm.

Figure 5:
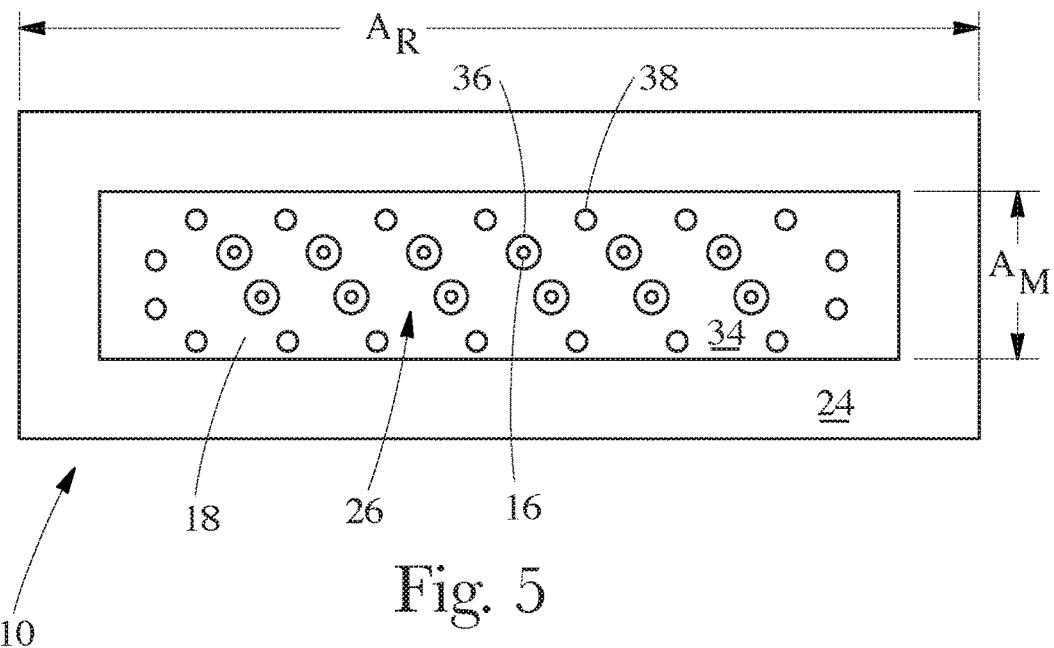
FIG. 5 is a top plan view of an example of a die assembly according to the present invention.

As shown in FIG. 5, the probe is centered along the narrow, minor axis $A_M$ of the fluid environment 18 in the open area 26, which is in fluid contact with the filament exit holes 16 of the filament forming nozzles of the die assembly 10, and defines a zero position. The probe should be at least 5 cm away from the die assembly edges along the longer, major axis $A_R$ of the fluid environment 18 in the open area 26. The traverse is used to move the probe across the narrow, minor axis $A_M$ of the fluid environment 18 on 1 mm spacings, far enough that the surrounding temperature can be measured along with the main fluid environment's temperature.

The resulting temperature data is rescaled to yield a normalized temperature profile. The maximum and minimum temperature for the dataset is determined. For each temperature measurement at position x, a normalized temperature is calculated.

If the maximum temperature corresponds to the fluid environment temperature then the normalization formula is as follows:

$$TNormal_X = \frac{T_X - T_{min}}{T_{max} - T_{min}}$$

If the minimum temperature corresponds to the fluid environment temperature, then the normalization formula is $$TNormal_X = \frac{T_{max} - T_X}{T_{max} - T_{min}}$$

Figure 6:
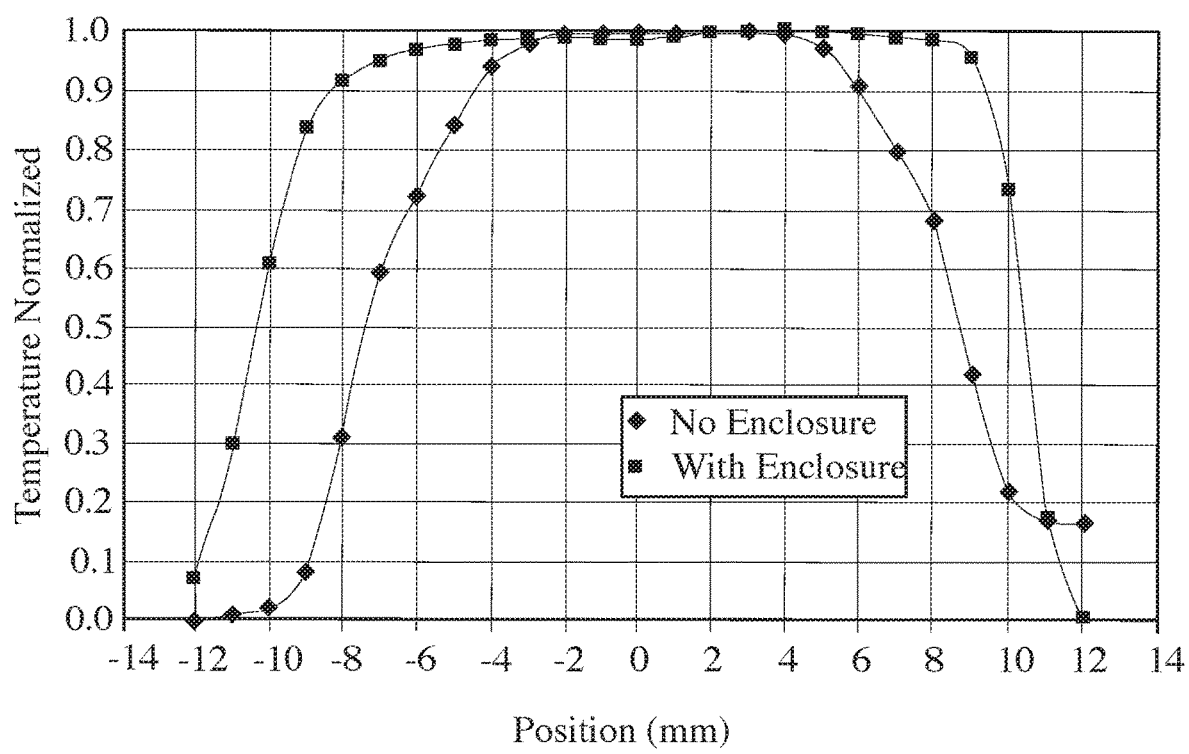
FIG. 6 is a top plan view of another example of a die assembly according to the present invention.

The normalized temperature data is then plotted with the probe position (x) shown on the abscissa and the normalized temperature shown on the ordinate. The effective jet width of the fluid environment is then determined graphically by determining the two points where the fluid environment achieves 90% of the normalized temperature, an example of such as graph is shown in FIG. 6, which shows a normalized temperature profile for both a die assembly outside the scope of the present invention labeled "No Enclosure" and a die assembly within the scope of the present invention, labeled "With Enclosure". The width is then the difference in abscissa positions between these two 90% points.

Once the width is determined, then the % effective jet width is determined.

$$\% \, EffectiveJetWidth = 100 \times \frac{EffectiveJetWidth}{AirPlateWidth}$$

The air plate width is defined as the width between the outermost edge of the outermost holes in the air plate, lying along the minor axis of the air plate. The resulting value is the value that is reported as the % Effective Jet Width value that the fluid environment maintains across the filament exit holes of the filament forming nozzles.

The dimensions and values disclosed herein are not to be understood as being strictly limited to the exact numerical values recited. Instead, unless otherwise specified, each such dimension is intended to mean both the recited value and a functionally equivalent range surrounding that value. For example, a dimension disclosed as "40 mm" is intended to mean "about 40 mm."

Every document cited herein, including any cross referenced or related patent or application, is hereby incorporated herein by reference in its entirety unless expressly excluded or otherwise limited. The citation of any document is not an admission that it is prior art with respect to any invention disclosed or claimed herein or that it alone, or in any combination with any other reference or references, teaches, suggests or discloses any such invention. Further, to the extent that any meaning or definition of a term in this document conflicts with any meaning or definition of the same term in a document incorporated by reference, the meaning or definition assigned to that term in this document shall govern.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

What is claimed is:

1. A die assembly comprising a plurality of filament forming nozzles, wherein the filament forming nozzles comprise filament exit holes from which filaments exit the filament forming nozzles during operation, wherein the die assembly further comprises a single uninterrupted open area surrounding all of the filament forming nozzles of the die assembly, wherein all of the filament forming nozzles extend at least partially through, but less than completely through the single uninterrupted open area through which a fluid exits the die assembly during operation, wherein the single uninterrupted open area defines a fluid environment around the filament exit holes of the filament forming nozzles such that the fluid contacts the filament exit holes, wherein at least a portion of the fluid that contacts the filament exit holes is supplied by a fluid flow path that is divided into at least two different fluid cavities, wherein a first fluid cavity of the at least two different fluid cavities is formed between at least a bottom surface of a nozzle plate comprising the plurality of filament forming nozzles and an upper surface of an air plate, wherein a second fluid cavity of the at least two different fluid cavities is formed between a bottom surface of the air plate and a recess in an upper surface of an enclosure plate that defines the single uninterrupted open area, wherein the air plate comprises a plurality of holes through which one or more of the filament forming nozzles extend, and wherein the air plate further comprises one or more holes that are void of the filament forming nozzles and that are configured to direct the fluid towards the second fluid cavity.

2. The die assembly according to claim 1 wherein the enclosure plate comprises at least one edge that defines a boundary of the single uninterrupted open area that converges toward the filament exit holes of the filament forming nozzles.

3. The die assembly according to claim 1 wherein the first fluid cavity and the second fluid cavity are configured for directing the fluid to the single uninterrupted open area.

4. The die assembly according to claim 1 wherein the fluid comprises air.

5. A die assembly comprising a plurality of filament forming nozzles, wherein the filament forming nozzles comprise filament exit holes from which filaments exit the filament forming nozzles during operation, wherein the die assembly further comprises a single uninterrupted open area surrounding all of the filament forming nozzles of the die assembly, wherein all of the filament forming nozzles extend at least partially through, but less than completely through the single uninterrupted open area through which a fluid exits the die assembly during operation, wherein the single uninterrupted open area that defines a fluid environment in fluid contact with the filament exit holes that maintains greater than 85% of an effective jet width of the fluid environment across the filament exit holes, as measured according to a % Effective Jet Width Test Method, during operation of the die assembly, wherein at least a portion of the fluid that contacts the filament exit holes is supplied by a fluid flow path that is divided into at least two different fluid cavities, wherein a first fluid cavity of the at least two different fluid cavities is formed between at least a bottom surface of a nozzle plate comprising the plurality of filament forming nozzles and an upper surface of an air plate, wherein a second fluid cavity of the at least two different fluid cavities is formed between a bottom surface of the air plate and a recess in an upper surface of an enclosure plate that defines the single uninterrupted open area, wherein the air plate comprises a plurality of holes through which one or more of the filament forming nozzles extend, and wherein the air plate further comprises one or more holes that are void of the filament forming nozzles and that are configured to direct the fluid towards the second fluid cavity.

6. The die assembly according to claim 5 wherein the enclosure plate comprises at least one edge that defines a boundary of the single uninterrupted open area that converges toward the filament exit holes of the filament forming nozzles.

7. The die assembly according to claim 5 wherein the fluid comprises air.

8. A method for forming filaments, the method comprising the steps of:
   providing a die assembly according to claim 1,
   operating the die assembly, and
   producing filaments from the filament forming nozzles of the die assembly.

* * * * *